United States Patent

Schmoyer

[11] 3,897,710
[45] Aug. 5, 1975

[54] AUDIO-VISUAL METHOD AND APPARATUS FOR TEACHING MELODY AND CHORD MANIPULATION OF KEYBOARD MUSICAL INSTRUMENTS

[76] Inventor: Arthur Robert Schmoyer, The Cedars Rt. 16, Woolford, Md. 21677

[22] Filed: June 21, 1974

[21] Appl. No.: 481,879

[52] U.S. Cl. .......................... 84/478; 35/6; 35/9 A
[51] Int. Cl.² ............................................. G09B 15/08
[58] Field of Search .................... 84/470–485; 35/6, 9 A

[56] References Cited
UNITED STATES PATENTS

| | | | |
|---|---|---|---|
| 3,377,716 | 4/1968 | Schmoyer | 84/478 |
| 3,379,087 | 4/1968 | Weitzner | 84/478 |
| 3,724,097 | 4/1973 | Schmoyer | 84/478 X |
| 3,823,637 | 7/1974 | Scott | 84/470 |

Primary Examiner—Lawrence R. Franklin
Attorney, Agent, or Firm—Gardiner, Sixbey, Bradford & Carlson

[57] ABSTRACT

A device for teaching operation of a keyboard musical instrument includes indicator lights associated with melody keys and both a changeable pictorial image and light indicators associated with the chord keys. A program of audio instructions includes cue signals for operating the melody key indicators and for changing the pictorial image. The chord key indicators are, however, activated not from the program but from indicia at the pictorial image producer. A color association is established between the chord indicator lights and the pictorial image.

8 Claims, 3 Drawing Figures

PATENTED AUG 5 1975   3,897,710

AUDIO-VISUAL METHOD AND APPARATUS FOR TEACHING MELODY AND CHORD MANIPULATION OF KEY-BOARD MUSICAL INSTRUMENTS

ENVIRONMENT OF INVENTION

This invention relates to the field of audio-visual teaching methods and apparatus, particularly as they are applied to teaching the operation of a keyboard musical instrument which involves the manipulation of a first group of keys for playing melody notes and a second group of keys for playing chord notes.

BACKGROUND OF INVENTION

1. Prior Art

Numerous methods and apparatus have been suggested wherein a prerecorded program of audio instructions and cueing signals is effective to synchronize operation of audio reproduction equipment and visual displays for purposes of instruction in the operation of keyboard operated musical instruments.

One such apparatus is disclosed in my U.S. Pat. No. 3,377,716 issued April 16, 1968 whereby a prerecorded sound record includes cues for operating light indicators visually associated with keys in both the melody and chord portions of the keyboard.

I have in the past also found that the sustained sounding of chord notes together with the learning difficulty of manipulating three keys simultaneously are more readily met when the key associated light indicators are augmented by pictorial representations of the left hand on the keyboard. An apparatus incorporating this feature is disclosed in my U.S. Pat. Nos. 3,693,493 and 3,724,097. In this apparatus, light indicators and film strip advancement are both keyed directly from prerecorded cues on the sound tape.

Goodell et al. U.S. Pat. No. 3,021,611 discloses a teaching apparatus for an unrelated type of instrument wherein visual stimuli are displayed by a film strip projector and activation of tactile indicators on the keyboard is initiated by cues on the film strip, the activation being for a period less than the duration of the display of the visual stimuli.

OBJECTS OF INVENTION

Among the objects of this invention is a principal objective of alleviation of a problem inherent in the apparatus mentioned first above. Where it is necessary to provide audio (or subaudio or super sonic) cues for simultaneous operation of two different groups of signals, the probability of cross talk (interference between cue signals) requires elaborate and expensive filtering in the decoding apparatus. This is particularly so in the case of musical instruction wherein in one group each indicator is actuated momentarily for the melody, whereas in the other group individual indicator actuation is sustained throughout the period of solicitation of playing a chord, and several (three) indicators must be simultaneously actuated. This, and other objects of this invention are enumerated as the provision of a method and apparatus for instruction through plural groups of keyboard associated indicators and a pictorial display wherein:

1. the previous need for precisely accurate decoding equipment is alleviated,
2. problems of cross-talk between simultaneously occuring cue signals are obviated,
3. syncronization of audio instructions with both momentary activation of one group of signals and sustained actuation of another group of signals is readily obtained, and
4. a color association is established between the pictorial representation and a particular key of which a substained manipulation is being solicited.

DESCRIPTION OF DRAWINGS

These and other self-evident advantages of this invention will be better understood by a consideration of the ensuing specification and accompanying drawings, in which.

DESCRIPTION OF APPARATUS OF INVENTION

Figure 1:
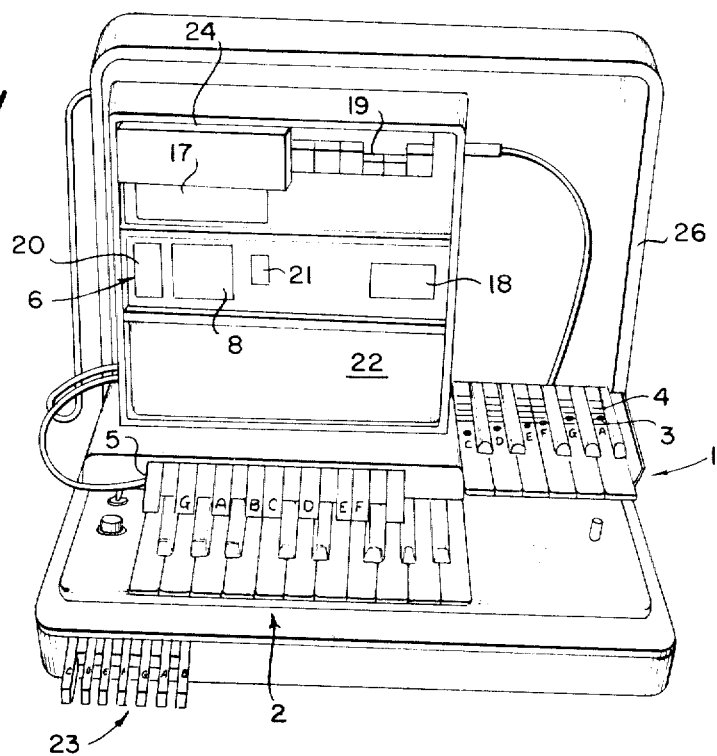
FIG. 1 is a perspective view of the apparatus of this invention.

Referring to FIG. 1, a preferred embodiment of the invention comprises a student's console comprising a keyboard including a first portion 1 including keys to which a student's response by the right hand is to be directed in playing melody notes, and a second portion 2 including keys to which a student's response in playing chord notes is to be directed. Each keyboard portion includes indicator lights each of which is associated with an individual key. In the illustrated embodiment, the indicator lights of the first portion are placed on the upper surface of the key as at 3 and are arranged upon indicia 4 in a manner indicative of the position of that particular note, while those on the second portion are arranged on a light bar 5 of the type set forth in my aforementioned U.S. Pat. No. 3,693,493, again visually associating individual indicators with respective keys as set forth fully in the said patent. It should be understood that other means of establishing visual association of indicators and keys are fully equivalent for the purposes of this invention.

Figure 2:
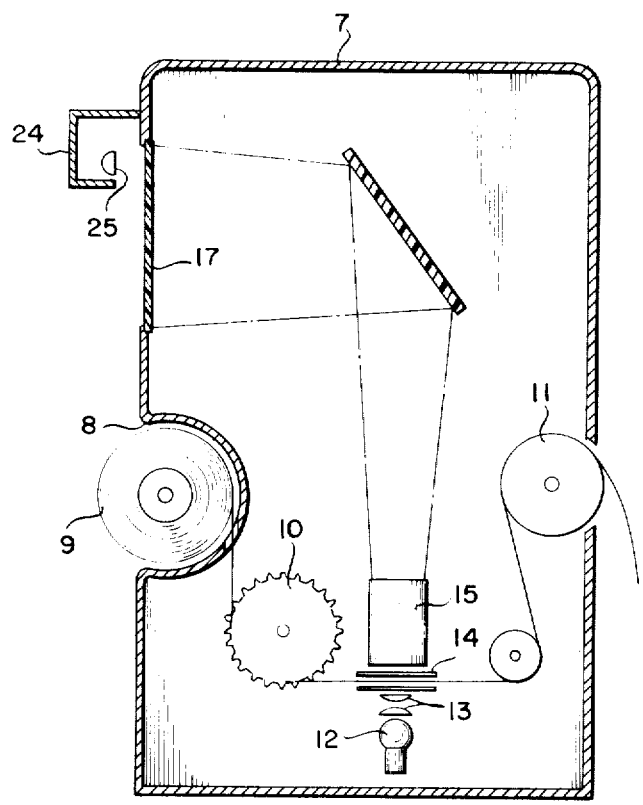
FIG. 2 is a diagramatic cross-sectional view of a modified film strip projector.

In additon to the aforementioned groups of indicator lights, the apparatus of this invention includes means for displaying a pictorial representation of images of the second portion 2 of the keyboard. Said means comprises a film strip projector indicated diagramatically in FIG. 2 and including a housing 7 having a pocket 8 for reception of a roll of film strip 9, film strip advance means 10, film strip delivery means 11, a light source 12, condenser lenses 13, film gate 14, lens system 15, reflecting mirror 16, and rear projection screen 17. All of the foregoing elements are conventional, a preferred projector being the Auto-Vance Mark II Audio Study Mate as marketed by Singer-Graflex. A more complete description of this type of projector may be found in U.S. Pat. No. 3,680,754 issued Aug. 1, 1972. This unit incorporates a tape player including a conventional cassette deck 18 and controls 19, and is capable of reading prerecorded cueing signals from the tape and activating the advance mechanism 9 incrementally to advance the film strip by one frame upon the occurrence of each cue. A manually activatable advance is also provided at 20 which, when used with an index 21 is convenient for synchronizing the film strip with the audio tape. Audio reproduction of instructional information from the tape is through speaker 22 in conventional fashion.

For purposes of detecting the presence of cueing indicia on the film strip 9, a housing 24 is affixed in a position overlying a portion of the screen 17, in which are disposed a plurality of photoelectric sensors 25. In a preferred embodiment, fifteen such sensors are provided in a single row extending the width of the screen. For aesthetic reasons, the sensors can be disposed within the housing 7 at a position withtin the optical path to intercept the projected cue signals yet to be discussed, in which instance the projected image on the screen 17 would be exclusive of the cueing indicia which are intercepted by the sensors 25.

Where it is desired to include a capability for instruction in the playing of the clavier pedals of an organ, an additional indicator 23 representative of the pedals may be provided. The indicator 23 in the illustrated embodiment is a plug-in unit, thus facilitating removal when not in use.

The entire unit is housed in a readily portable case 26 such as is known as an attachee case, thus facilitating portability thereof.

Figure 3:
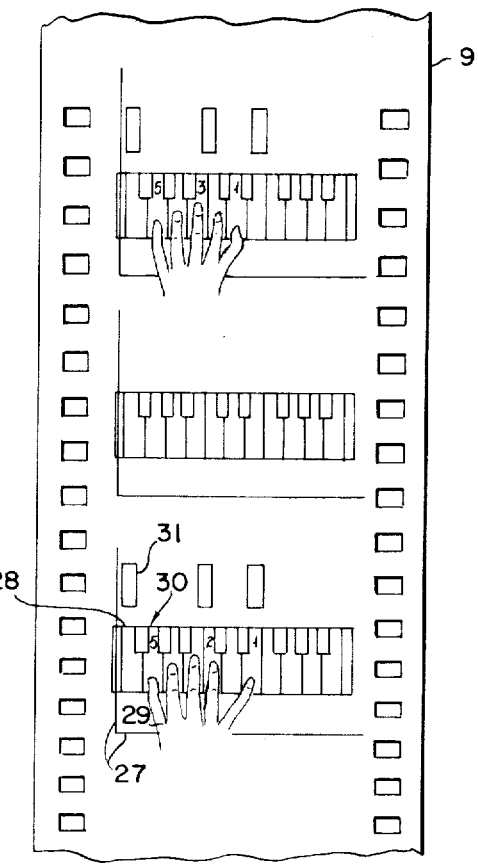
FIG. 3 is a segment of a film strip.

With reference to FIG. 3, the film strip 9 includes an instructional sequence of frames of pictorial representations of the keyboard, some with and some without superimposed visual instructional indicia and associated cueing indicia. Three such frames are illustrated in FIG. 3 wherein each frame is defined in part by indexing lines 27 useful in aligning the pictorial representations during production of the film strip and in alignment with the sensors in the projector itself. The pictorial representations, like those disclosed in my aforementioned U.S. Pat. No. 3,724,097, comprise a likeness 28 of the aforedefined second portion of a keyboard, in some frames further including visual instructional indicia such as a representation 29 of a demonstrator's hand in playing position and/or alphanumerical designations 30 to identify a finger or key. Also within the frame are cueing indicia 31 representative of the keys identified by the aforesaid visual instructional indicia 29 and/or 30.

In one particular embodiment, the visual instructional indicia appears as a distinctly colored key, in which instance the color is selected to correspond with the color of the corresponding light on light bar 5. For example, a green key surface may be imparted to a designated key in the pictorial representation by placing a green overlay on the key during preparation of the film strip. In this instance, a green light in light bar 5 would be focused on the surface of the designated key of keyboard portion 2 in the manner of my aforementioned U.S. Pat. No. 3,693,493 thus providing a color association between the pictorial image and the key itself.

The cueing indicia 31 are accurately positioned in a line transverse to the longitudinal run of the film strip, the position of each corresponding to a light on light bar 5 visually associated with a key on keyboard portion 2 to which instructional attention is to be directed. In FIG. 3 these indicia are adjacent to the image which they accompany, it being understood that they may be otherwise positioned to accommodate a different position of the photosensors and still fall within the scope of the term "accompanied by" as used in the ensuing claims. In the embodiment incorporating the claviar pedal indicator 23, an additional row of cueing indicia (not shown) is provided above the row of indiciators 31, in which case the indicia of each row may have a lesser major dimension than that shown in FIG. 3.

A tape for use in tape player 18 is magnetically prerecorded with a program of synchronized audio instruction, cueing signals indicative of respective melody notes of the first keyboard portion, and cueing signals indicative of times for advancement of the film strip projector. Both types of cueing signals are of relatively short duration, the former being only long enough to actuate an indicator 3 for a period sufficient to apprise a student of the key to be depressed and the latter of momentary nature detectable by the decoder and effective to actuate the projector advance mechanism. Because of this short duration, projector advance may easily be scheduled between activation of indicators 3 thus positioning both cue signals in a spaced sequential relationship and obviating any need for the simultaneous occurrence of any two cue signals on the tape.

In operation, a casette for a desired lesson is placed in the tape player 18, and a corresponding film strip 9 is placed in pocket 8 and indexed by manual advance 20 to project the first frame thereon screen 17. The tape player 18 is activated by control 19 to initiate read out of the program thereon. As the audio message is reproduced to apprise the student of the performance desired of him, cueing signals are decoded to activate indicators 3 and thus solicit manipulation of the melody portion 1 of the keyboard. Inasmuch as manipulation of the melody portion is characterized by key depressions of short duration, decoding in the manner of my aforesaid U.S. Pat. No. 3,377,716 can be readily accomplished without encountering excessive overlapping of signals and consequent cross-talk and false triggering of indicators.

As the lesson proceeds, instruction is directed to the second, or chord, portion of the keyboard. Here a somewhat different problem is inherent in the fact that a chord is characterized by three simultaneously sounded notes and these notes are sustained for a considerable duration. To avoid cross-talk, the chord indicator 5 is not activated directly from the magnetic tape, but from the film strip projector which in turn is slaved to the tape. Hence, upon read-out from the tape of an appropriate cue for projector advance, a pictorial image is projected upon screen 17. This image is that of the portion 2 of the keyboard, during the projection of which audio instructions might be of a nature familiarizing the student with certain keys but not soliciting manual response. In this instance, no cueing indicia accompany the particular frame and the light bar indicator remains dark. Such a frame is illustrated as the center frame in FIG. 3. However, when a point in the instruction is reached whereat manipulative response is to be solicited on the chord portion of the keyboard, another projector advance cue on the tape advances the projector to the next succeeding frame. Again an image is projected on screen 17, preferably with indicia superimposed on the keyboard image. The indicia may be in the form of identifying numbers 30, note designations, and/or an image of a correctly positioned hand 29. The cueing indicia 31 are also projected, but are not visible to the operator inasmuch as they are intercepted by the sensors 25 and housing 24. The sensors 25 are effective to activate the corresponding indiciators on light bar 5, thus augmenting the audio and projected image media. The light bar appropriately remains activated in the same sense throughout the display of that frame of instruction and is not affected by cueing signals being read from the tape for activation of the melody note indicators. Where activation for less than the entire duration of display of a single frame of instruction is desired, appropriate time delay means (not shown) may be incorporated to that end. Even when such lesser period of activation is employed, it remains appropriate that it be of substantial duration in relation to the period of activation of the melody note indicators 3, preferable being sustained substantially throughtout the display of that frame.

The specific arrangement and structure described throughout the foregoing specification are set forth as merely exemplary and not as limits on the scope of my invention, which is to be determined by a consideration of the following claims.

I claim:

1. A system for instruction in operation of a muscial instrument having a keyboard including a first portion including keys to which student response by the right hand is to be directed in playing melody notes and a second portion including keys to which student response by the left hand is to be directed in playing chord notes, said system comprising:
A. at least two distinct visual indiciators, namely
   a. a first group of indicator lights each of which is visually associated with a respective key of said first portion of said keyboard;
   b. a second group of indicator lights each of which is visually associated with a respective key of said second portion of said keyboard,
B. at least two distinct programming media namely
   a. means for sequentially reading-out a series of still optical indicia, said means comprising
      a. a film strip comprising a plurality of successive frames of optical cueing indicia indicative of respective chord notes of said second keyboard portion,
      b. a projector for incrementally advancing said film strip to project successive frames thereof,
      c. means for sensing the projected cueing indicia of a respective frame throughout the period of projection of said respective frame,
   b. tape means for storing a pre-recorded program of synchronized audio and visual instructional information, said program including
      a. audio instruction,
      b. cueing signals indicative of times for advancement of said film strip projector to indicate changes in chord note instruction, and
      c. cueing signals including signals occurring in intervals between said advancement cueing signals and indicative of respective melody notes of said first keyboard portion, which notes change during said period of projection,
C. control means including means for
   a. continuously advancing said pre-recorded program,
   b. sensing and audibly reproducing said audio instructions,
   c. sensing said melody note cueing signals and in response thereto activating respective indicators of said first group,
   d. sensing said advancement time cueing signals and in response thereto effecting an incremental advancement of said film strip projector, and
   e. sensing the cueing indicia of the frame being projected and in response thereto effective to activate respective indicators of said second group and to sustain the activation thereof substantially throughout the display of that frame, whereby the melody note indicator lights are activated directly from the pre-recorded program whereas activation of the chord note indicator lights is slaved to the projection of particular frames of said film strip.

2. A system for instruction in the operation of a musical instrument as set forth in claim 1 wherein said sensing means is adjacent to a portion of the screen and includes a housing enclosing the sensing means and overlying said portion of the screen.

3. A system for instruction in the operation of a musical instrument as set forth in claim 1 wherein said sensing means is interposed within the optical projection path between said strip and said screen.

4. A system for instruction in operation of a musical instrument having a keyboard as set forth in claim 1 wherein said melody note cueing signals and said projector advance cueing signals occur in spaced sequential relationship.

5. A system for instruction in the operation of a musical instrument as set forth in claim 1, said system additionally including a forth distinct visual indicator comprising a third group of indicator lights indicative of clavial keys to be depressed in conjunction with said chord notes, said film strip including additional cueing indicia for operation of said third group of indicator lights, and additional means for sensing said additional cueing indicia.

6. A system for instruction in the operation of a musical instrument as set forth in claim 1 wherein said successive frames of said film strip include pictoraial representations of images of said second portion of said keyboard with instructional stimuli superimposed on said keyboard and said projection of successive frames serves to display said images on a screen visible to the student.

7. A method of providing instruction in the operation of a musical instrument which includes a keyboard including a first portion including keys to which student response by the right hand is to be directed in playing melody notes and a second portion including keys to which student response by the left hand is to be directed in playing chord notes and where there is provided first and second groups of indicator lights, individual lights of each group being visually associated with individual keys of said first and second portions, respectively, said method comprising the steps of
A. preparing at least two distinct programming media, namely
   a. a film strip comprising a plurality of successive frames of optical cueing indicia indicative of respective chord notes of said second keyboard portion, and
   b. a pre-recorded program of synchronized audio and visual instructional information, said program including
      a. audio instruction,
      b. cueing signals indicative of times for advancement of saaid film strip projector to indicate changes in chord note instruction, and
      c. melody note cueing signals including signals occuring in intervals between said advancement cueing signals and indicative of respective melody notes of said first keyboard portion, B. instructing in the playing of chord notes by
  a. continuously advancing said program of synchronized information,
  b. projecting a frame of said film strip,
  c. sensing said advancement cueing signals and in response thereto
  d. incrementally advancing said film strip to project a succeeding frame of optical cueing indicia,
  e. sensing said optical and indicia and in response thereto
  f. activating said second group of indicators whereby the activation of said second group is sustained substantially throughout the display of the corresponding frame, and C. instructing in the playing of melody notes by
  a. sensing said melody cueing signals and in response thereto
  b. activating said first group of indicators.

8. A method for providing instruction in a musical instrument as set forth in claim 7 wherein said film strip frames include pictorial representations of images of said second portion of said keyboard with instructional stimuli superimposed on said images and said step of projecting a frame comprises projection of said pictorial representation on a screen visible to the student.

* * * * *